United States Patent
Aftab et al.

(10) Patent No.: US 10,685,378 B2
(45) Date of Patent: Jun. 16, 2020

(54) GENERATING PRODUCT CATALOGS USING TRACKING PIXELS

(71) Applicant: Facebook, Inc., Menlo Park, CA (US)

(72) Inventors: Hamza Aftab, San Francisco, CA (US); Rohan Kuruvilla, San Francisco, CA (US); Eric Gaudet, San Jose, CA (US); Shashikant Khandelwal, Mountain View, CA (US); Kai Ding, San Jose, CA (US); Risha Nagin Chheda, Mountain View, CA (US); Xintao Chen, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 308 days.

(21) Appl. No.: 15/607,226

(22) Filed: May 26, 2017

(65) Prior Publication Data
US 2018/0341981 A1     Nov. 29, 2018

(51) Int. Cl.
*G06Q 30/02*     (2012.01)
*G06F 16/335*     (2019.01)

(52) U.S. Cl.
CPC ....... *G06Q 30/0255* (2013.01); *G06F 16/337* (2019.01); *G06Q 30/0272* (2013.01); *G06Q 30/0201* (2013.01); *G06Q 30/0253* (2013.01)

(58) Field of Classification Search
CPC .......... G06Q 30/0255; G06Q 30/0272; G06Q 30/0201; G06F 16/337
USPC ........................... 705/26.1, 26.7, 7.29, 26.41
See application file for complete search history.

(56) References Cited

U.S. PATENT DOCUMENTS

| | | | |
|---|---|---|---|
| 2011/0040611 A1* | 2/2011 | Simmons | G06Q 30/0242 705/14.41 |
| 2011/0125593 A1* | 5/2011 | Wright | G06Q 30/02 705/14.73 |
| 2013/0124309 A1* | 5/2013 | Traasdahl | H04L 67/22 705/14.49 |
| 2014/0222502 A1* | 8/2014 | Urban | G06Q 30/0277 705/7.29 |
| 2014/0244429 A1* | 8/2014 | Clayton | G06Q 30/0631 705/26.7 |
| 2014/0279232 A1* | 9/2014 | Lau | G06Q 30/0207 705/26.41 |
| 2015/0112803 A1* | 4/2015 | Heiser, II | G06Q 30/0255 705/14.53 |
| 2015/0378578 A1* | 12/2015 | Zhang | G06F 3/048 715/765 |
| 2017/0213212 A1* | 7/2017 | Dicker | G06Q 20/3829 |
| 2018/0204225 A1* | 7/2018 | Bennefeld | H04L 67/20 |

* cited by examiner

*Primary Examiner* — Vanel Frenel
(74) *Attorney, Agent, or Firm* — Fenwick & West LLP

(57) ABSTRACT

An online system aggregates content item from third party systems for presentation to users of the online system. To do so, the online system accesses the web pages of third party systems to trigger tracking pixels that have been previously placed by the third party systems. A triggered tracking pixel sends a server call to the online system that includes tracking pixel data such as information about the content item that was available on the web page. Based on the information gathered through various tracking pixels, the online system generates a catalog of the content item that can then be presented to a user of the online system such that the user can browse content items of the third party system while accessing the online system.

20 Claims, 4 Drawing Sheets

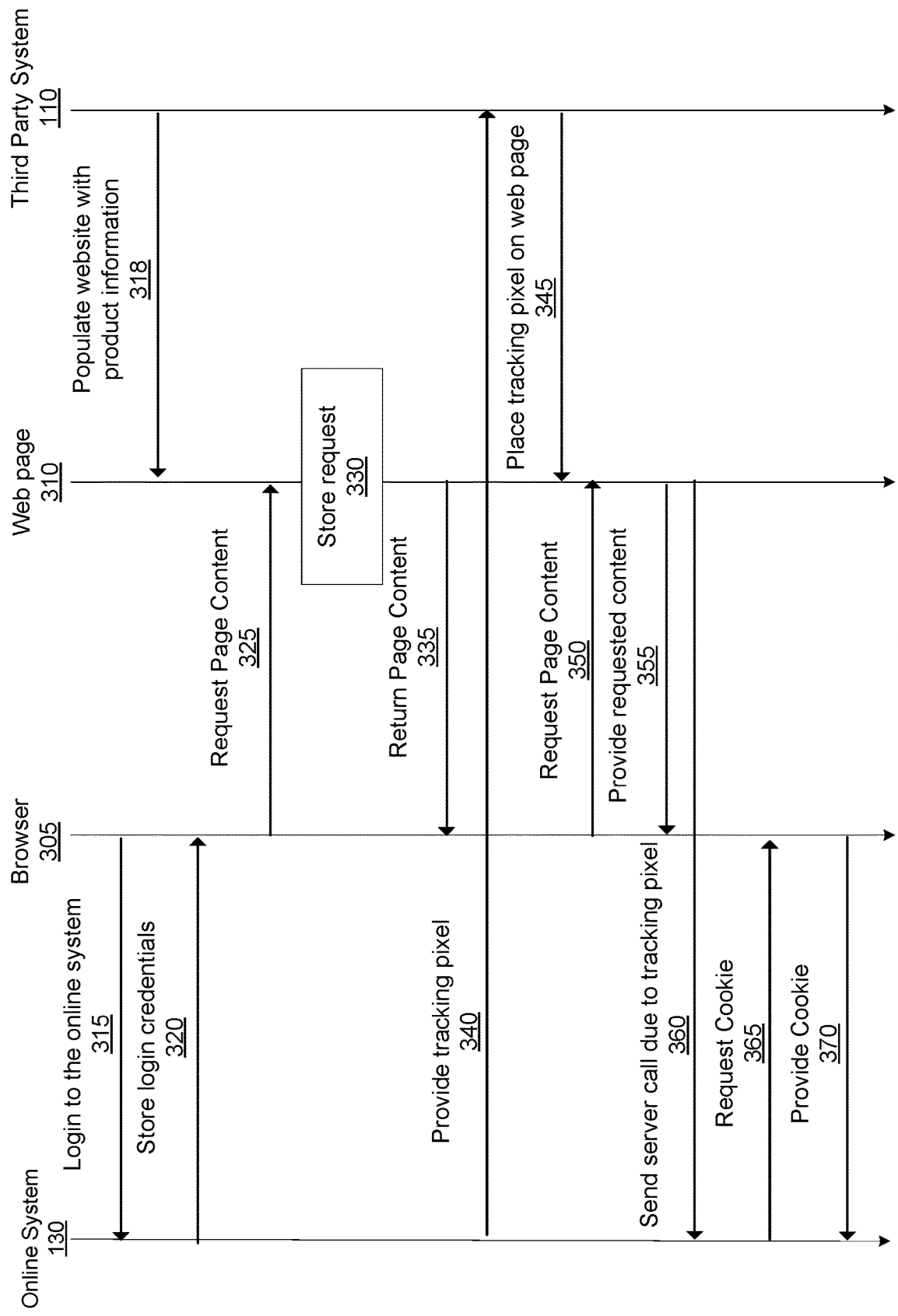

GENERATING PRODUCT CATALOGS USING TRACKING PIXELS

BACKGROUND

This disclosure generally relates to presenting content, and more specifically to generating and presenting content items obtained from a third party system using tracking pixels.

An online system presents information of interest to users of the online system. In many cases, this information includes content items of third party systems that a user may be interested in researching further. But to do so, the user must often navigate to a web page of the third party system and locate the content items of interest to access the information. Additionally, if the user would like to compare the content items of a third party system to the same or similar content items from a different third party system, the user must also navigate to the web page of the different third party system. Altogether, this process remains tedious and cumbersome and may contribute to a poor user experience.

SUMMARY

An online system obtains content item information from web pages of third party systems and aggregates the content item information. In one embodiment, the content item information is aggregated into a catalog of content items from multiple different third party systems. The online system can generate the catalog for a user of the online system such that content items that are likely to be of the highest interest to the user will be included in the catalog. Therefore, the user can access the generated catalog that includes content items that are likely to be of interest to the user without the user having to leave the online system and navigate to the multiple different web pages to view the content items.

In various embodiments, the online system and a third party system work together to track the behavior of users that browse the web pages of the third party system. For example, the third party system may be a third party merchant selling products that are represented by the content items on their web page. Accordingly, tracking pixels provided on the web pages of the third party system send a server call to the online system each time users access the web pages. The server call includes information such as an identification of the product on the web page and the user who accessed the page. In various embodiments, the online system may itself browse the web pages of the third party system to trigger the tracking pixels to gather or obtain product information from the tracking pixel data received as a result of the server call.

The online system analyzes the tracking pixel data, including product information, by identifying the user that triggered the tracking pixel and the server call. If the tracking pixel was triggered by a user of the online system, the online system can store an association between the user and the product that the user browsed, thereby indicating that the user exhibited an interest in the product. If the tracking pixel was triggered by the online system itself, the online system gathers and stores the information.

Accordingly, the online system generates a product catalog using the gathered product information based on an identified user of the online system or an identified group of users of the online system. Each generated product catalog may be personalized such that the user or the group of users would likely be highly interested in the products included in the generated product catalog. For example, the online system may determine, amongst the gathered product information, which products are likely to be of high interest based on actions that the user or group of users have previously undertaken in the online system. If a user demonstrates significant interest in a particular sport (e.g., liking, commenting, or joining a group related to the sport), then the online system generates a product catalog that includes products that are related to that particular sport. The online system can present the generated product catalog to a user of the online system such that the user can browse products of the third party system without straying from a web page of the online system. Alternatively, the online system can present the generated product catalog to the third party system such that the third party system can better understand the interest around its products.

BRIEF DESCRIPTION OF THE DRAWINGS

FIG. 3 depicts an interaction diagram for collecting product information from a third party system, in accordance with an embodiment.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Overview of System Environment

Figure 1:
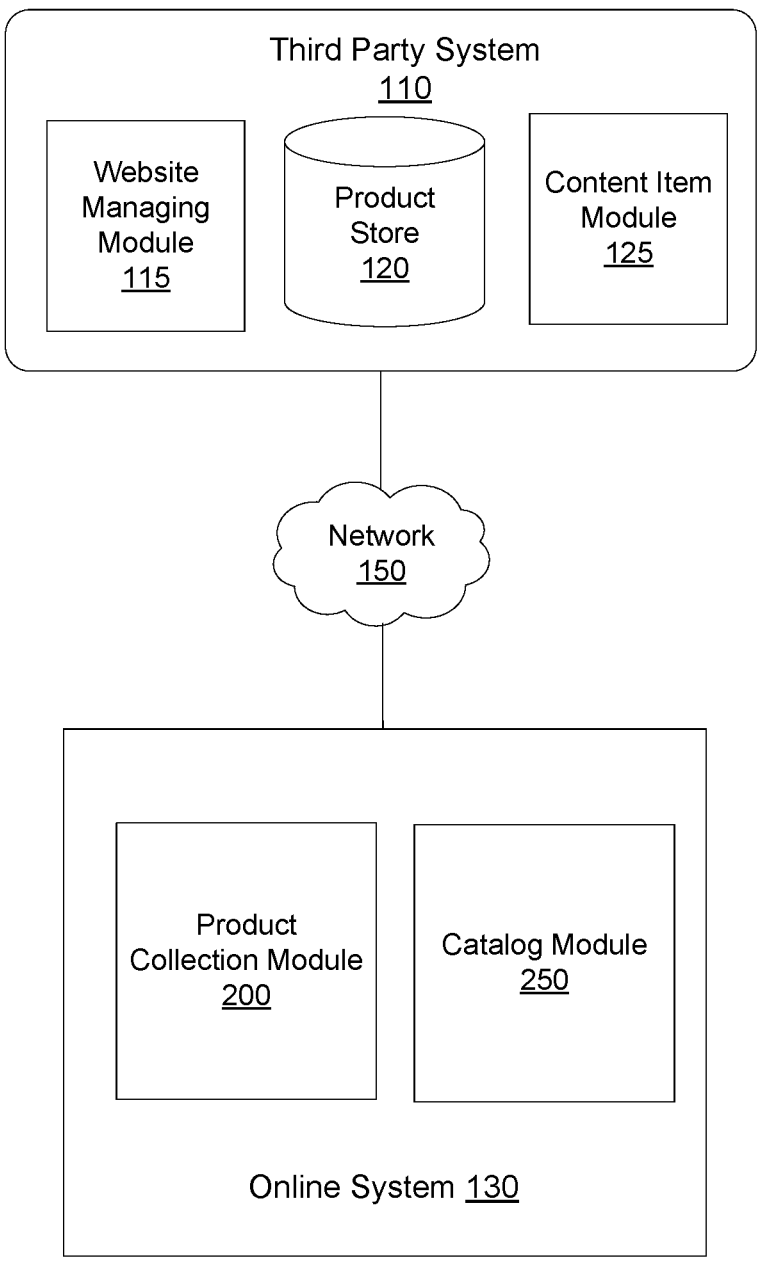
FIG. 1 illustrates a system environment including an online system for generating a product catalog including products from third party systems, in accordance with an embodiment.

FIG. 1 illustrates a system environment 100 including an online system 130 for generating and presenting a product catalog that includes products from a third party system 110 to users of the online system 130, in accordance with an embodiment. The system environment 100 includes an online system 130 connected to a third party system 110 through a network 150. Although the system environment 100 depicts one third party system 110, there may be any number of third party system 110 connected through the network 150 to the online system 130.

The third party system 110 hosts and manages online web pages that include product information. In various embodiments the third party system 110 is a third party merchant whose online web pages are accessed by users that are interested in purchasing products from the third party system 110. The third party system employs a website managing module 115 to host, manage, and update the web pages that include product information stored in the product store 120 of the third party system 110.

In various embodiments, the third party system 110 may collaborate with the online system 130 to track the browsing behavior of users of the online system 130 that access the product web pages of the third party system 110. For example, the website managing module 115 of the third party system 110 may receive, from the online system 130, tracking pixels that are then placed on product web pages. When a user accesses the web page with the tracking pixel, this triggers the tracking pixel to send a server call to the online system 130. As such, the online system 130 can receive the corresponding product information on the web page.

In various embodiments, the third party system 110 may additionally include a content item module 125 that generates content items that are to be presented to a user of the online system 130. A content item may include descriptive information regarding a product of the third party system 130 such that a user may be inclined to make a purchase of the product after interacting with the content item. The content item module 125 can tailor the content item for a user or a group of users based on information that it receives from the online system 130. For example, the content item module 125 may receive an analysis of the products of the third party 110 that indicates which products are likely to be of high interest to certain groups of users. Thus, the content item module 125 can strategize the development and presentation of the content items based on the received analysis.

The network 150 facilitates communications between the one or more third party systems 110 and the online system 130. The network 150 may be any wired or wireless local area network (LAN) and/or wide area network (WAN), such as an intranet, an extranet, or the Internet. In various embodiments, the network 150 uses standard communication technologies and/or protocols. Examples of technologies used by the network 150 include Ethernet, 802.11, 3G, 4G, 802.16, or any other suitable communication technology. The network 150 may use wireless, wired, or a combination of wireless and wired communication technologies. Examples of protocols used by the network 150 include transmission control protocol/Internet protocol (TCP/IP), hypertext transport protocol (HTTP), simple mail transfer protocol (SMTP), file transfer protocol (TCP), or any other suitable communication protocol.

The online system 130 pulls product information from various third party systems 110 and generates a product catalog including the pulled product information to present to users of the online system 130. To do so, the online system 130 employs a product collection module 200 and a catalog module 250. In various embodiments, the online system 130 provides tracking pixels to third party systems 110 that are interested in tracking the browsing behavior of users that purchase products from the third party system 110. The online system 130 can similarly browse the web pages hosted by the third party system 110, thereby triggering tracking pixels that have been placed on product pages by the third party system 110. Upon triggering the tracking pixel, the online system 130 receives the triggered tracking pixel from the third party system along with information that was on the web page where the tracking pixel was placed. For example, this information includes descriptions of the product of the third party system 110 that was included on the web page.

The online system 130 analyzes the product information received from various third party system 110 and generates product catalogs including information describing the products of the third party system 110. The product catalog may be generated specifically for a user of the online system 130 such that the user may be interested in the particular products included in the product catalog. Additionally, the online system 130 may generate statistics on different product catalogs generated for users of the online system 130 to inform third party systems 110 as to products that are of high or low interest. Therefore, the third party system 110 can purchase appropriate advertisements based on the statistical information.

The useful information that is tracked and maintained by the online system 130 can be thought of in terms of a "social graph," which includes a plurality of nodes that are interconnected by a plurality of edges. Each node in the social graph may represent something that can act on and/or be acted upon by another node. Common examples of nodes include users, non-person entities, content items, groups, events, messages, concepts, and any other things that can be represented by an object or a web page by the online system 130. An edge between two nodes in the social graph represents a particular kind of connection between the two nodes, which may result from an action that was performed by one of the nodes on the other node.

Collecting Product Information

Figure 2A:
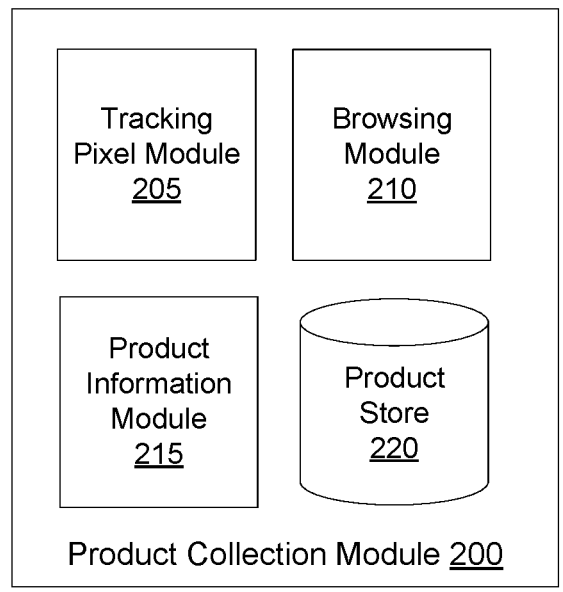
FIG. 2A illustrates a product collection module within the online system for collecting product information, in accordance with an embodiment.

FIG. 2A illustrates the product collection module 200 of the online system 130 that collects product information from a third party system 110, in accordance with an embodiment. The product collection module 200 includes a tracking pixel module 205, a browsing module 210, and a product information module 215.

The tracking pixel module 205 is responsible for generating tracking pixels and providing the generated tracking pixel to a third party system 110. For example, the tracking pixel module 205 provides a tracking pixel to the third party system 110 to be placed on a web site hosted by the third party system 110. In one embodiment, the tracking pixel is a segment of HTML code. For example, a tracking pixel is a transparent 1×1 image, an iframe, or other suitable object that may be embedded in a web site. In many scenarios, a third party system 110 may place a tracking pixel on a web page to understand user actions the user was taking on the web page (e.g., putting a product in a shopping cart, completing a checkout process, browsing a product page, subscribing for an email listing etc.), price of product a user looked at or purchased, a SKU number for the product, a color, style, type or size of the product, a timestamp, among other data.

At a subsequent time, when a tracking pixel placed on a web page of the third party system 110 is triggered, the HTML code of the tracking pixel causes a server call to the online system 130. Thus, the tracking pixel module 205 receives the tracking pixel (e.g., 1×1 transparent image) in the server call. In many embodiments, the tracking pixel module 205 also receives additional information, hereafter referred to as tracking pixel data, in the server call. For example, tracking pixel module 205 may also receive information about the user (e.g., identifying information of the user such as hashed personally identifiable information or a user identifier of the online system 130) or the actions (e.g., purchase, add to cart) the user is taking on the web page as part of the tracking pixel data. As another example, the tracking pixel module 205 also receives information about the content on the web page such as the product information (e.g., name of product, image, color, price, style, etc.). The tracking pixel module 205 passes along the tracking pixel data received through the server call to the product information module 215 for further processing.

The browsing module 210 browses web pages of the third party system 110 to trigger tracking pixels that are placed on the web pages of the third party system 110. More specifically, the browsing module 210 enables the online system 130 to receive product information from the third party system 110 through the triggering of tracking pixels. To do so, the browsing module 210 may use a browser to browse the web pages of the third party system 110. In many scenarios, the browsing module 210 indiscriminately browses the web pages hosted by a third party system 110 to trigger tracking pixels. In other scenarios, to save the online system 130 time and computing resources, the browsing module 210 may employ a machine learning model that specializes in identifying web pages with product information. In some embodiments, a machine learning model is trained specifically based on a web page template of the third party system 110 such as the home page. For example, the machine learning model may be trained to prefer drop down menus on a home page (e.g., drop down menus may indicate a higher likelihood of product links) as opposed to links at the bottom of a home page (e.g., links for contact information, physical store locations, site search, or other information). Therefore, in employing a machine learning model, the browsing module 210 need not browse every single web page hosted by the third party system 110 to trigger tracking pixels that are primarily located on product information pages.

In various embodiments, the browsing module 210 may additionally be associated with a user identifier of the online system 130 such the online system 130 can readily identify that the browsing module 210 was responsible for triggering a tracking pixel based on the user identifier. As an example, the browsing module 210 may first use the browser to provide unique login credentials (e.g., a user identifier) to login to an account of the online system 130. Upon providing the unique login credentials, the browser can store the unique login credentials in the browser cookie. When the browsing module 210 triggers a tracking pixel that sends a server call, the user identifier of the online system 130 in the stored cookie is also sent along either with the server call or separately in addition to the server call.

The product information module 215 collects information regarding one or more products and stores the product information in the product store 220 to be used to generate a product catalog. To do so, the product information module 215 parses through the product information received in tracking pixel data due to various server calls. For example, the product information module 215 can identify a descriptive category of a product that is then stored in the product store 220. A descriptive category includes but is not limited to, the name of the product, an image of the product, product attributes (e.g., color, size), an SKU number, descriptive text, price, product rating and/or feedback, among other information. Additionally, the product information module 215 can receive product information from a variety of third party systems 110 and categorizes them based on the third party system 110 that the product is associated with.

In various embodiments, the product information module 215 determines whether to store product information received through a server call based on who triggered the tracking pixel and caused the ensuing server call. The product information module 215 determines the responsible party by utilizing the identifying information (e.g., user identifier of the online system 130, hashed personally identifiable information) included with or in addition to the server call.

In one scenario, the received product information is associated with identifying information associated with a user of the online system 130. This scenario occurs when a user of the online system 130 browses a web page of the third party system 110 and triggers a tracking pixel. Therefore, the product information module 215 receives the user's actions on the web page (e.g., added a particular product to the cart) as well as any information on the web page (e.g., product name, product description, etc). Therefore, the product information module 215 associates the received product information with a user profile of the online system 130, indicating that the user associated with the user profile is or has shown interest in that product. More specifically in the context of the online system 130, the product information module 215 may store an edge between a node representing the user profile and a second node representing the entity that the user has exhibited interest in (e.g., the product, third party system 110).

In another scenario, the product information module 215 receives tracking pixel data including product information received through a server call that is associated with identifying information that belongs to the browsing module 210. Therefore, the product information module 215 can readily determine that the product information received through this server call was triggered by the browsing module 210. As such, the product information module 215 stores the product information in the product store 220 for later use in generating the product catalog, as previously described.

Reference is now be made to FIG. 3, which depicts an interaction diagram for collecting product information from a third party system 110, in accordance with an embodiment. As illustrated in FIG. 3, the players of the interaction diagram include the online system 130, a browser 305, a web page 310, and a third party system 110. In various embodiments, the browser 305 is operated by the online system 130 (e.g., the browsing module 210) to browse web pages. In other words, the online system 130 and the browser 305 may be a single entity as opposed to the two separate entities as depicted in FIG. 3. Additionally, in various embodiments, the web page 310 is hosted by the third party system 110 and includes information pertaining to a product sold by the third party system 110. One skilled in the art can appreciate a variety of different scenarios in which the online system 130 receives information via a tracking pixel placed on a web page 310 of a third party system 110.

In various embodiments, the browsing module 210 uses the browser 305 to login 315 to the online system. For example, the browsing module 210 provides login credentials that includes a user identifier of the online system 130 that was previously assigned to the browsing module 210. The online system 130 can store 320 the provided login credentials on the browser 305 in, as an example, a cookie. The third party system 110 (e.g., the website managing module 115) can populate 318 various web pages 310 hosted by the third party system 110 with product information. For each web page 310, the website managing module 115 continues to maintain and/or update the web page 310 (e.g., product is out of stock or back in stock, new product is available).

The following steps (steps 325, 330 and 335) depict the general scenario where the browser 305 is used to browse a web page 310 where a tracking pixel has not been placed on the web page 310. The browsing module 210 of the online system 130 interacts with the various web pages of the third party system 110. For example, the browsing module 210 browses the web page 310 of the third party system. When it does, the browser 305 requests 325 page content from the web page 310. The web page 310 stores 330 the request sent by the browser 305 and returns 335 the page content to the browser 305.

In various embodiments, in addition to browsing the web pages 310, the browser 305 may also provide a login to the third party system 110 using a third party system user ID that the browsing module 210 has previously set up with the third party system 110. For example, third party system user IDs are associated with user accounts on the third party system 110 and further include information or preferences of the user (e.g., status of a purchase order, previously purchased products, previously viewed products). In these scenarios, when the browser 305 requests page content from the web page 310, the web page 310 can also store the third party system user ID used by the browser 305 in the request. In various embodiments, the third party system user ID is stored on the browser 305 in a cookie.

The online system 130 and the third party system 110 may also work together to better understand the behavior of users that browse the web pages 310 of the third party system 110 through use of a tracking pixel, as now described in relation to steps 340, 345, 350, 355, and 360. More specifically, the tracking pixel module 205 of the online system 130 provides 340 one or more tracking pixels to the third party system 110. The third party system 110 can then decide which web pages to place the tracking pixels. In many scenarios, the third party system 110 places 345 a tracking pixel on a web page 310 that includes product information because the third party system 110 is interested in understanding the product browsing behavior of its users. After the tracking pixel is placed on the web page 310, the browser 305 can request 350 for page content of the web page 310. The web page 310 provides 355 the requested content to the browser 305.

In various embodiments, the request made by the browser 305 also triggers the tracking pixel that was placed on the web page 310. The triggering of the tracking pixel (e.g., the HTML code) sends 360 a server call to the online system 130. As previously described, the server call may also include tracking pixel data that enables the online system 130 to receive the product information of the third party system 110. For example, the HTML code of the tracking pixel, when triggered (e.g., executed), causes information associated with the web page 310 to be sent to the online system 130. For example, the information associated with the web page 310 includes information about the product that was included on the web page 310. The additional information can also include user identifiers (e.g., user ID of the online system 130, third party system user ID) or user actions (e.g., add product to cart, etc.) performed by the user on the web page 310.

In various embodiments, the online system 130 can gather information in place of or in addition to the server call. In one embodiment, the server call to the online system 130 domain may cause a redirect request to the online system 130 such that the online system 130 can access the information in the stored cookie. In one embodiment, the online system 130 can request 365 for the stored cookie on the browser 305 which is then provided 370 by the browser 305 to the online system 130. The stored cookie can also include the user identifiers (e.g., user ID of the online system 130, third party system user ID) or user actions (e.g., add product to cart) performed by the user on the web page 310. Thus, the product information module 215 of the online system 130 can then proceed with identifying who triggered the tracking pixel and decide whether to store the received product information.

Generating Product Catalogs

Figure 2B:
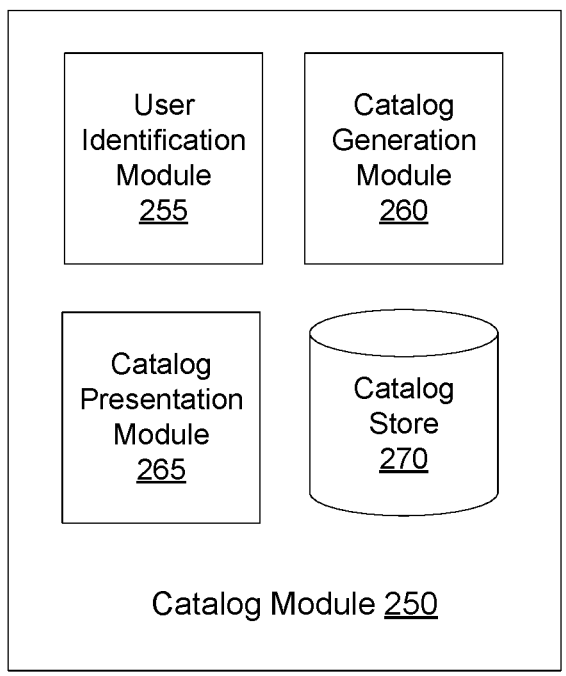
FIG. 2B depicts a catalog module within the online system for presenting product catalogs, in accordance with an embodiment.

FIG. 2B depicts the catalog module 250 of the online system 130 which generates a product catalog specific for a user (or group of users) of the online system 130 that includes the product information that was gathered from the third party system 110. Furthermore, the catalog module 250 can present the generated product catalog to users of the online system 130 or to the third party system 110. The catalog module 250 includes a user identification module 255, a catalog generation module 260, and a catalog presentation module 265.

The user identification module 255 identifies one or more users of the online system 130 that the product catalog will be generated for. As an example, the user identification module 255 may generate a product catalog in response to a received request. In one embodiment, the request can be sent by a third party system 110 that is interested in determining how to best design an advertisement campaign for a particular group of users of the online system 130 where the individuals in the group share a common characteristic (e.g., age group, gender, other identifying information). Therefore, the user identification module 255 identifies the group of users of the online system 130 and retrieves user profile information that belong to the group of users of the online system 130. In another embodiment, the user identification module 255 receives a request from a user of the online system 130 that is interested in viewing a product catalog that includes products of a third party system 110. Therefore, the user identification module 255 identifies the user of the online system 130 and retrieves user profile information from that user's user profile.

The retrieved user profile information can include any information that indicates whether a user is interested or not interested in an entity such as a product or a third party system 110. This information may have been previously stored based on actions performed by the user. For example, a user may have previously performed an action (e.g., a post, a like, etc.) on the online system 130 that indicates an interest in a particular sport (e.g., basketball, football). As a result, the online system 130 stores an edge that connects a node representing the user profile associated with the user to a node representing the sport. As another example, as previously described, the online system 130 may have stored an edge between the user's user profile and a product of the third party system 110 because the user had triggered a tracking pixel when browsing a web page of the third party system 110 that included the product. Therefore, when retrieving user profile information, the user identification module 255 can retrieve the stored edges associated with the user's user profile. The user identification module 255 can provide this user interest information to the catalog generation module 260 for determining what products are to be included in the catalog.

In the scenario that the user identification module 255 identifies a group of users, the user identification module 255 may conduct additional logic that analyzes and identifies common interests amongst the identified group of users. For example, if the identified group of users corresponds to male, 18-25 year old users of the online system 130, the user identification module 255 may identify common interests amongst these users that pertain to sports, video games, or sports cars. Thus, the user identification module 255 may present this user interest information to the catalog generation module 260 for further analysis.

The catalog generation module 260 retrieves the product information from the product store 220, receives the user interest information associated with the identified one or more users of the online system 130, and proceeds to generate a product catalog. In various embodiments, the catalog generation module 260 generates a product catalog that only includes products from a third party system 110 and that is personalized for the one or more users. For example, the catalog generation module 260 ranks each product from the third party system 110 based on the received user interest information to generate a product catalog that includes products that are likely of high interest to a user.

To rank the products, the catalog generation module 260 may first score each product based on whether the product is likely to be of interest to a user. In various embodiments, the catalog generation module 260 can initially assign weights to the different categories of descriptive information of a product (e.g., type of product, product attributes such as a specific color or size, price, product rating and/or feedback). These initially assigned weights can be pre-determined. For example, the initially assigned weight to the product category of "color" may be lower than the initially assigned weight of the "type of product" (e.g., apparel, computer, etc.) because a user would more likely be interested in seeing a particular type of product in various colors as opposed to various products of a particular color.

The catalog generation module 260 can tailor the initially assigned weights based on the user interest information of the user. As an example, if a user has frequently posted comments remarking about how fantastic a new laptop is, but the price point is too expensive, the catalog generation module 260 may assign higher weights to products that are categorized as "laptop" while also increasing the weight associated with the "price" category. Therefore, the catalog generation module 260 may more favorably score a product that is a laptop with a lower price point as compared to a laptop with a higher price point.

In other embodiments, the catalog generation module 260 may employ a machine learning model that is trained specifically for a user (or a group of users). Therefore, instead of using the initially assigned weights and subsequently tailoring the weights, each user (or group of users) may have a trained machine learning model that continuously tailors the weights to the different product categories over time.

The catalog generation module 260 ranks the products based on each score associated with the product. Therefore, the products that are likely to be of highest interest to a user (or group of users) will be ranked highly. The catalog generation module 260 may choose to select a threshold number of top-ranking products to be included in the product catalog. Alternatively, products included in the product catalog may be selected based on their scores being above a pre-determined threshold score.

In various embodiments, the catalog generation module 260 generates a product catalog using a web page template. The web page template may be specific for the online system 130 or it may be a web page template that mimics a web page of the third party system 110. The web page template specifies locations to place the ranked products (e.g., a continuous list of ranked products, an N by N array of ranked products). Additionally, the web page template can specify where to place the descriptive category of a product such as the name, image, price, and/or rating of a product.

Although the aforementioned descriptions focus on generating a product catalog that includes products only from a single third party system 110, in some embodiments, the catalog generation module 260 may pool product information that is obtained from various third party systems 110. Thus, in the embodiment where a user of the online system 130 is interested in viewing and/or purchasing products, the user can be presented with a product catalog that includes highly ranked products from a variety of third party systems 110, thereby enabling the user to quickly compare and contrast the various products from various third party system 110 while accessing the online system 130.

The catalog presentation module 265 presents the generated product catalog. In one embodiment, the catalog presentation module 265 presents the generated product catalog to a third party system 110 such that the third party system 110 can tailor a campaign (e.g., advertising campaign) based on the products that are included in the product catalog. For example, the generated product catalog may include products that the catalog generation module 260 has ranked for a group of users (e.g., a target audience that fits characteristics of being 18-25 year old and male) that the third party system 110 is interested in targeting through an advertising campaign. Therefore, the third party system 110 can use the generated product catalog to make determinations as to which products to more heavily invest in. For example, a product that is ranked highly may only require minimal advertising before it becomes popular through word of mouth sharing. As another example, the third party system 110 can decide to invest more heavily in presenting content items (e.g., advertisement) on a new product line that is likely to be of interest, but is not yet well-known to the group of users.

In another embodiment, the catalog presentation module 265 presents the generated product catalog to a user of the online system 130 that is interested in viewing and/or purchasing products of the third party system 110. Here, the user of the online system 130 is able to view the products of the product catalog while accessing the online system 130 without having to access a web page of the third party system 110. In some embodiments, the product catalog is configured such that if a user of the online system 130 interacts with a particular product, the user is redirected to the web page of the third party system 110 that includes the particular product. Therefore, the user of the online system 110 can complete a purchase of the product through the third party system 110. In another embodiment, the product catalog is configured such that the user can complete a purchase of a product on the online system 130 and the online system 130 subsequently informs the third party system 110 of the purchase.

Generating and Presenting Product Catalogs by the Online System

Figure 4:
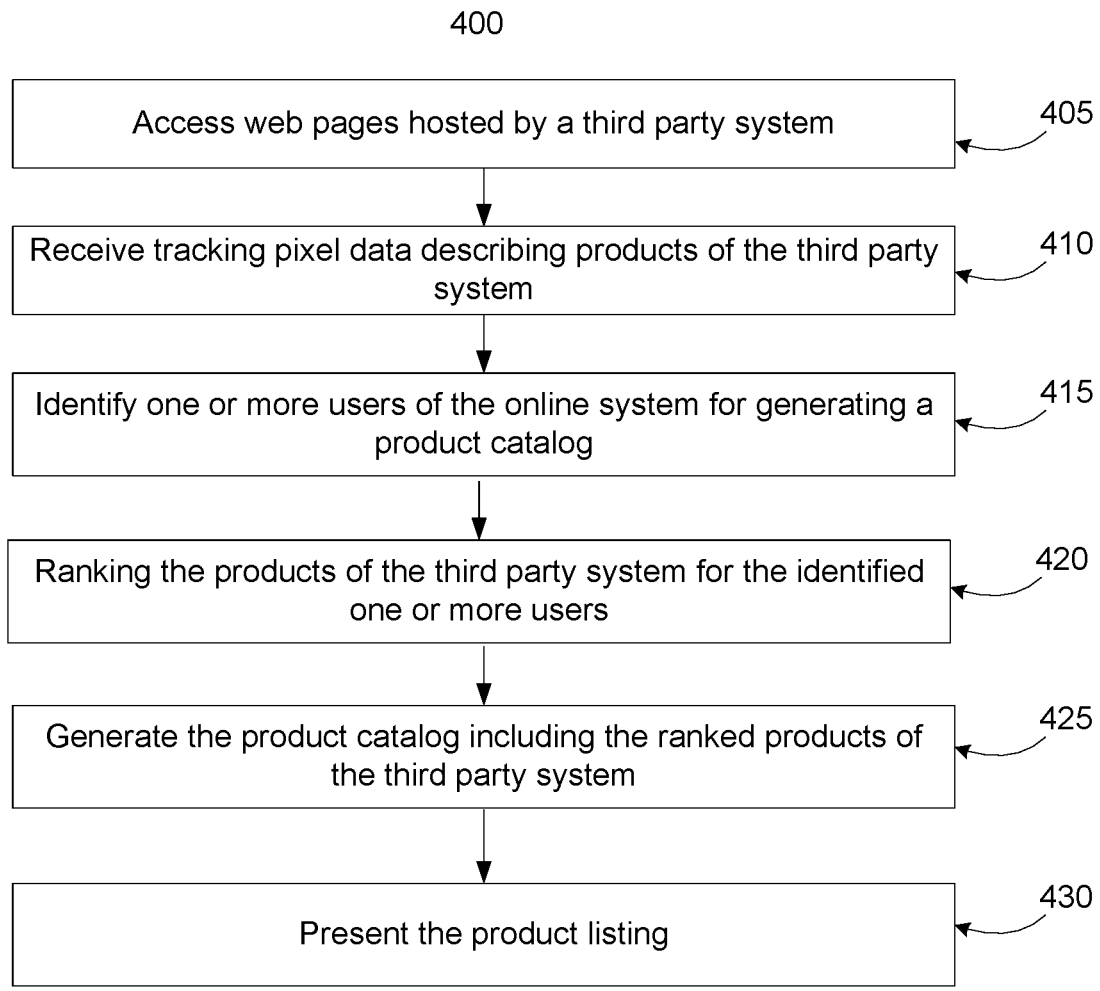
FIG. 4 depicts a flow chart for generating and presenting a product catalog, in accordance with an embodiment.

FIG. 4 depicts a flow process for generating and presenting a product catalog, in accordance with an embodiment. The online system browses 405 the web pages hosted by a third party system to trigger tracking pixels that have been previously placed on the web pages. The triggered tracking pixel sends a server call to the online system 130. Therefore, the online system 130 receives 410 tracking pixel data from the server call or in addition to the server call, the tracking pixel data describing product information of the third party system 110 that was included on a browsed web page.

The online system 130 identifies 415 one or more users (or a group of users) of the online system 130 for generating a product catalog. For example, the online system 130 identifies one or more users based on a received request from the third party system 110 to present advertisements to a group of users. Alternatively, the online system 130 identifies one or more users based on a received request from a user of the online system 130 to view a product catalog.

The online system 130 ranks 420 the products of the third party system 110 for the identified one or more users. For example, the online system 130 can utilize any information associated with the user of the online system 130 (e.g., prior interest in specific products, specific third party system 110, etc.) to rank the products. Once the products are ranked, the online system 130 generates 425 a product catalog based on the rankings. For example, the highest ranked products are placed first in the product catalog.

The online system 130 presents 430 the generated product catalog. In one embodiment, the online system 130 presents the generated catalog to the third party system 110 such that the third party system 110 can decide how to tailor its ad campaign based on the ranked products in the generated product catalog. In another embodiment, the online system 130 presents the generated catalog to a user of the online system 130 that may be highly interested in products of a third party system 130. Therefore, the user of the online system 130 can be informed of highly ranked, interesting products directly through the online system 130.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   accessing, by an online system, a plurality of web pages hosted by third party systems external to the online system, each web page of the plurality of web pages corresponding to a product sold by a third party system and comprising product information for the product sold by the third party system, wherein the online system stores a set of interests for each user of the online system;
   for each webpage of the plurality of web pages,
      triggering, by the online system, a tracking pixel on the web page, wherein the triggering causes the online system to receive tracking pixel data from the web page;
      responsive to receiving the tracking pixel data at the online system, determining product information for a product on the web page, wherein the product information and the product are stored by the online system;
   responsive to identifying a user of the online system to be presented a product catalog,
      ranking, based on a set of interests for the identified user, each product included in the tracking pixel data received from tracking pixels on the plurality of web pages for the identified user using the determined product information and information describing the identified user of the online system such that the ranking represents an interest of the identified user in each product included in the tracking pixel data;
      aggregating each product included in the tracking pixel data ranked above a threshold ranking into a product catalog comprising products of interest to the user; and
      presenting, to the identified user of the online system, the product catalog.

2. The method of claim 1, wherein the tracking pixel data comprises descriptive categories that describe each product on the web page.

3. The method of claim 1, wherein the tracking pixel is placed on the web page by the third party system hosting the webpage.

4. The method of claim 1, wherein the tracking pixel is previously provided by the online system to the third party system hosting the webpage.

5. The method of claim 1 further comprising:
   identifying a responsible party that triggered the tracking pixel; and
   responsive to determining that the online system is the responsible party, storing product information included in the received tracking pixel data.

6. The method of claim 5, wherein identifying the responsible party comprises identifying user identifier information received from a stored cookie.

7. The method of claim 1, wherein the identified user sends a request to the online system to view the product catalog.

8. The method of claim 1, wherein ranking each product included in the tracking pixel data received from tracking pixels on the plurality of web pages for the identified user based on the determined product information and information describing the identified user of the online system comprises:

for each product included in the tracking pixel data:
assigning a weight to each descriptive category of the product obtained from the received tracking pixel data;
adjusting each weight based on the set of interests for the identified user of the online system; and
generating a score for the product based on the adjusted weights.

9. The method of claim 1, wherein the set of interests for the identified user of the online system corresponds to one or more actions that the user has previously performed.

10. The method of claim 1, wherein the product catalog is presented to the identified user of the online system on a web page hosted by the online system.

11. A non-transitory computer-readable medium comprising computer code that, when executed by a processor of a computer, causes the processor to perform the steps comprising:

browsing, by an online system, a plurality of web pages hosted by third party systems external to the online system, each web page of the plurality of web pages corresponding to a product sold by a third party system and comprising product information for the product sold by the third party system, wherein the online system stores a set of interests for each user of the online system;

for each webpage of the plurality of web pages,
triggering, by the online system, a tracking pixel on the web page, wherein the triggering causes the online system to receive tracking pixel data from the web page;

responsive to receiving the tracking pixel data at the online system, determining product information for a product on the web page, wherein the product information and the product are stored by the online system;

responsive to identifying a user of the online system to be presented a product catalog,
ranking, based on a set of interests for the identified user, each product included in the tracking pixel data received from tracking pixels on the plurality of web pages for the identified user using the determined product information and information describing the identified user of the online system such that the ranking represents an interest of the identified user in each product included in the tracking pixel data;
aggregating each product included in the tracking pixel data ranked above a threshold ranking into a product catalog comprising products of interest to the user; and presenting, to the identified user of the online system, the product catalog.

12. The computer-readable medium of claim 11, wherein the tracking pixel data comprises descriptive categories that describe each product on the web page.

13. The computer-readable medium of claim 11, wherein the tracking pixel is placed on the web page by the third party system hosting the webpage.

14. The computer-readable medium of claim 11, wherein the tracking pixel is previously provided by the online system to the third party system hosting the webpage.

15. The computer-readable medium of claim 11 further comprising computer code that, when executed by a processor of a computer, causes the processor to perform the steps comprising:

identifying a responsible party that triggered the tracking pixel; and responsive to determining that the online system is the responsible party, storing product information included in the received tracking pixel data.

16. The computer-readable medium of claim 15, wherein identifying the responsible party comprises identifying user identifier information received from a stored cookie.

17. The computer-readable medium of claim 11, wherein the identified user sends a request to the online system to view the product catalog.

18. The computer-readable medium of claim 11, wherein ranking each product included in the tracking pixel data received from tracking pixels on the plurality of web pages for the identified user based on the determined product information and information describing the identified user of the online system comprises:

for each product included in the tracking pixel data:
assigning a weight to each descriptive category of the product obtained from the received tracking pixel data;
adjusting each weight based on the set of interests for the identified user of the online system; and
generating a score for the product based on the adjusted weights.

19. The computer-readable medium of claim 11, wherein the set of interests for the identified user of the online system corresponds to one or more actions that the user has previously performed.

20. The computer-readable medium of claim 11, wherein the product catalog is presented to the identified user of the online system on a web page hosted by the online system.

* * * * *